United States Patent
Demetrescu et al.

(10) Patent No.: US 6,934,270 B2
(45) Date of Patent: Aug. 23, 2005

(54) METHOD OF DECODING UPLINK STATUS FLAGS FOR RT-EGPRS USERS

(75) Inventors: Cristian Demetrescu, Twickenham (GB); Konstantinos Samaras, Swindon (GB); Louis Gwyn Samuel, Swindon (GB); Magnus Sandell, Swindon (GB); Jian Jun Wu, Reading (GB); Ran-Hong Yan, Farington (GB)

(73) Assignee: Lucent Technologies Inc., Murray Hill, NJ (US)

( * ) Notice: Subject to any disclaimer, the term of this patent is extended or adjusted under 35 U.S.C. 154(b) by 829 days.

(21) Appl. No.: 09/816,041

(22) Filed: Mar. 23, 2001

(65) Prior Publication Data

US 2003/0156546 A1 Aug. 21, 2003

(30) Foreign Application Priority Data

Mar. 28, 2000 (EP) .............................................. 00302526

(51) Int. Cl.⁷ .............................................. H04L 12/56
(52) U.S. Cl. .................................... 370/328; 370/310.2
(58) Field of Search ...................... 370/310.01, 310.02, 370/328, 338, 349

(56) References Cited

U.S. PATENT DOCUMENTS

| | | | |
|---|---|---|---|
| 5,499,246 A | | 3/1996 | Cooper ...................... 370/95.1 |
| 5,910,949 A | | 6/1999 | Bilstrom et al. ............ 370/337 |
| 6,356,759 B1 | * | 3/2002 | Mustajarvi .................. 455/450 |
| 6,359,904 B1 | * | 3/2002 | Hamalainen et al. ....... 370/469 |
| 6,430,163 B1 | * | 8/2002 | Mustajarvi .................. 370/310 |

FOREIGN PATENT DOCUMENTS

| | | | |
|---|---|---|---|
| WO | WO 99/41918 | 8/1999 | ............ H04Q/7/22 |

* cited by examiner

*Primary Examiner*—Kenneth Vanderpuye

(57) ABSTRACT

In the GPRS, a method of decoding uplink status having reduced interleaving depth in a RLC/MAC block is proposed; for RT-EGPRS users, all of the uplink flag bits are provided in the first burst of the four bursts; and for EGPRS users, nine bits of the uplink status flags are provided in the first burst of the RLC/MAC block and the remaining bits in the next three bursts. On receiving the first nine bits, a mobile performs an autocorrelation to identify the USF whether it belongs to the EGPRS or to the RT-EGPRS group.

12 Claims, 5 Drawing Sheets

——— (36,3) min dist=20    – – – (48,3) min dist=27
- - - - (36,2) min dist=20   – — – (48,2) min dist=27

METHOD OF DECODING UPLINK STATUS FLAGS FOR RT-EGPRS USERS

CROSS-REFERENCE TO RELATED APPLICATION

This application claims priority of European Patent Application No. 00302526.9, which was filed on Mar. 28, 2000.

FIELD OF THE INVENTION

This invention relates to a method of decoding Uplink Status Flags (USFs) in a telecommunications service such as the Real-Time General Packet Radio Service (RT-GPRS).

BACKGROUND OF THE RELATED ART

Digital mobile communication systems for voice, such as the Global System for Mobile Communications (GSM) and Digital Advanced Mobile Systems (DAMPS) have expanded very quickly in recent years. Systems for data, such as the GPRS and Enhanced Data rate for GSM Evolution (EDGE) and Universal Mobile Telecommunications System (UMTS), are being developed rapidly, as wide acceptance of the Internet creates a substantial demand. Voice over the fixed packet switched network is being developed and it is expected that there will be an increasing volume of voice traffic using Internet Protocol (IP) networks. Potential demand for voice services over GPRS/Enhanced GPRS (EGPRS)/EDGE is expected to increase.

In GPRS and EGPRS/EDGE, in current arrangements, a Radio Link Control/Medium Access Control (RLC/MAC) block is interleaved over four Time Division Multiple Access (TDMA) bursts in four consecutive time frames. Consequently the USFs are also interleaved over four TDMA bursts, and a USF field cannot be decoded until all four TDMA bursts are received. This leads to a twenty millisecond USF field decoding delay, which in a voice service may not be acceptable.

It has been proposed in a co-pending patent application of the current applicant that one or more USF fields can be sent in one RLC/MAC block in the downlink, depending on the scheme to transmit such blocks. It has also been proposed in another co-pending application of the current applicant that the USF fields are transmitted only in the first burst, so that the polling algorithm is optimized and the mobile reply time is reduced. If the mobile reads its own USF in the first burst, then in the same twenty millisecond period (if the mobile is active) the mobile sends a voice packet on the corresponding uplink traffic channels. Unfortunately, when the USF fields are moved to the first burst, the interleaving depth_is reduced from four bursts to one burst. This degrades the BLock Error Rate (BLER) of the USF by about six dB.

This is illustrated in FIG. 1 which is a plot of the BLER of the USF against Eb/No using block code (36, 3); Typical Urban (TU) 50 is used and there is no Frequency Hopping (FH). The line E on FIG. 1 is a plot for a four burst interleaving in EDGE 8 PSK (Phase Shift Key) and the line V is a plot for voice over EDGE 8 PSK with one burst interleaving. The loss of about 6 dB is clear.

SUMMARY OF THE INVENTION

It is an object of the invention to provide a method to offset this loss due to reduced interleaving depth. According to the invention, in the general packet radio service telecommunications system, a method of decoding uplink status flags having reduced interleaving depth in a radio link control/medium access control block is characterized by: selecting a first plurality of uplink status flags and providing all of the flag bits in the first block of said group of bursts; selecting a second plurality of uplink status flags and providing a predetermined number of bits of the uplink status flags in the first burst of said group of bursts and the remaining bits in the other bursts of the group.

Also according to the invention, a general packet radio service system comprising a plurality of base transceiver stations; a plurality of radio network controllers; and a core network; characterized in that in each base transceiver station is arranged to code uplink status flags for a first group of voice users by providing all of the bits of the uplink status flag in the first burst of said radio link control/medium access control block, and for a second group of voice users by providing a predetermined number of bits in the first burst of said radio link control/medium access control block and the remaining bits in subsequent bursts.

Further according to the invention, a mobile terminal in a RT-EGPRS system in which each mobile terminal is associated with a first or a second group of users, and is arranged to perform an autocorrelation on a predetermined number of bits in a uplink status flag received from the first burst in said radio link control/medium access control block, whereby said terminal determines whether that uplink status flag is associated with the same group of voice users as said terminal.

DETAILED DESCRIPTION

Figure 1:
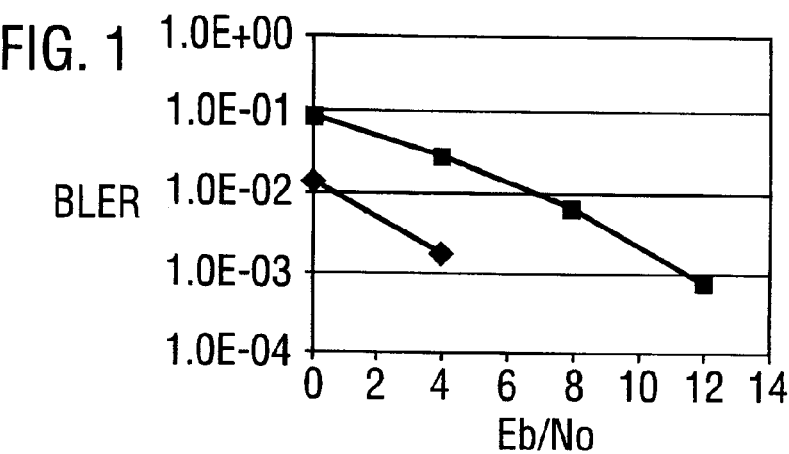
FIG. 1 illustrates the problem to be solved. The invention will be described by way of example only with reference to FIGS. 2 to 5 in which:—
Figure 2:
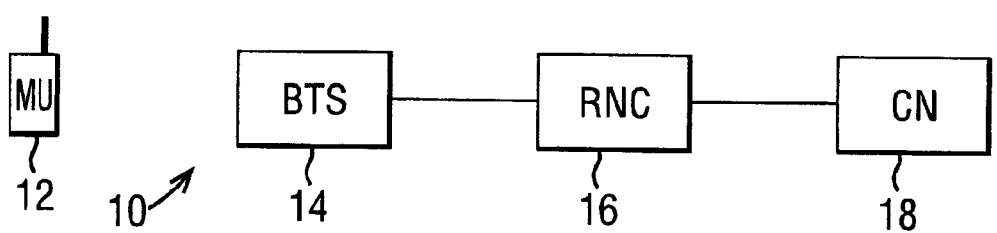
FIG. 2 is a highly schematic illustration of a part of the general packet radio service system.

In FIG. 2, in the GPRS 10, a Mobile User (MU) 12 is in a telecommunications cell controlled by a Base Transceiver Station (BTS) 14 which in turn is controlled by a Radio Network Controller 16 (RNC). The RNC is connected to a Core Network (CN) 18. The BTS 14 receives voice signals from the MU 12, forms them into RLC/MAC blocks, and the blocks are transferred through the GPRS 10 to the other party to a call.

Table I illustrates block coding schemes currently used.

TABLE I

USFs before block encoder

000 USF1
001 USF2
010 USF3
011 USF4
100 USF5
101 USF6
110 USF7
111 USF8

TABLE I-continued

USFs after block encoder

Usf1 =
[0 0 0 0 0 0 0 0 0 0 0 0 0 0 0 0 0 0 0 0 0 0 0 0 0 0 0 0 0 0 0 0 0 0 0 0];
Usf2 =
[1 1 1 1 0 0 0 0 1 1 1 1 0 0 0 0 1 1 1 1 1 1 0 0 0 1 1 1 1 1 0 0 0 1];
Usf3 =
[1 1 1 0 0 1 1 1 0 1 1 1 0 1 1 1 0 0 1 1 0 0 0 0 1 1 0 1 1 0 0 0 1 1 0 0];
Usf4 =
[1 0 0 1 1 1 1 0 0 1 1 0 0 0 0 0 1 1 1 0 1 1 1 0 1 1 1 0 0 1 0 0 1 1 1 1];
Usf5 =
[0 0 0 1 1 0 0 1 1 0 0 1 0 1 1 0 1 0 1 0 0 0 0 1 1 0 1 1 1 1 1 1 1 1 1 0];
Usf6 =
[1 1 0 1 0 1 0 1 1 0 0 0 1 1 0 1 0 1 0 1 1 1 0 1 0 1 1 1 0 0 1 0 1 0 1 1];
Usf7 =
[0 0 1 0 0 1 1 0 1 1 0 1 1 1 1 1 1 1 0 1 1 0 1 0 0 0 1 0 0 1 1 1 0 1 0 0];
Usf8 =
[0 1 1 0 1 0 1 1 1 0 1 0 1 0 1 1 1 1 0 0 0 1 1 1 1 1 0 0 1 0 0 1 0 0 1 1].

Considering now only the first nine bits of each encoded USF; these are given in Table II.

TABLE II

Usfb1 = [0 0 0 0 0 0 0 0 0];
Usfb2 = [1 1 1 1 0 0 0 0 1];
Usfb3 = [1 1 1 0 0 1 1 1 0];
Usfb4 = [1 0 0 1 1 1 1 0 0];
Usfb5 = [0 0 0 1 1 0 0 1 1];
Usfb6 = [1 1 0 1 0 1 0 1 1];
Usfb7 = [0 0 1 0 0 1 1 0 1];
Usfb8 = [0 1 1 0 1 0 1 1 1];

The eight USFs can be formed into two groups; one group comprises uncoded USFs of which the last bit is one; this group will be referred to as the EGPRS group. The other group comprises uncoded USFs of which the last bit is zero (See Table I) and this group will be referred to as the RT-EGPRS.

The two groups are shown in Table III.

TABLE III

| EGPRS | 001 | USF2 |
|---|---|---|
| | 011 | USF4 |
| | 101 | USF6 |
| | 111 | USF8 |
| RT-EGPRS | 000 | USF1 |
| | 010 | USF3 |
| | 100 | USF5 |
| | 110 | USF7 |

In the inventive arrangement, the system shown in FIG. 2 is arranged so that, when the RLC/MAC blocks are formatted, the EGPRS USFs are interleaved in four consecutive bursts, as in the prior art arrangement. However, the RT-EGPRS USFs are all placed in the first burst.

On receipt of a first burst, a mobile user 12 in the EGPRS/RT-EGPRS system performs an autocorrelation of the first nine bits of the received USF, to determine whether the USF is directed to EGPRS users or to RT-EGPRS users; autocorrelation of the nine bits will provide a definite peak at the relevant USF. The user 12 can then identify which of the eight USFs is present.

Figure 3A:
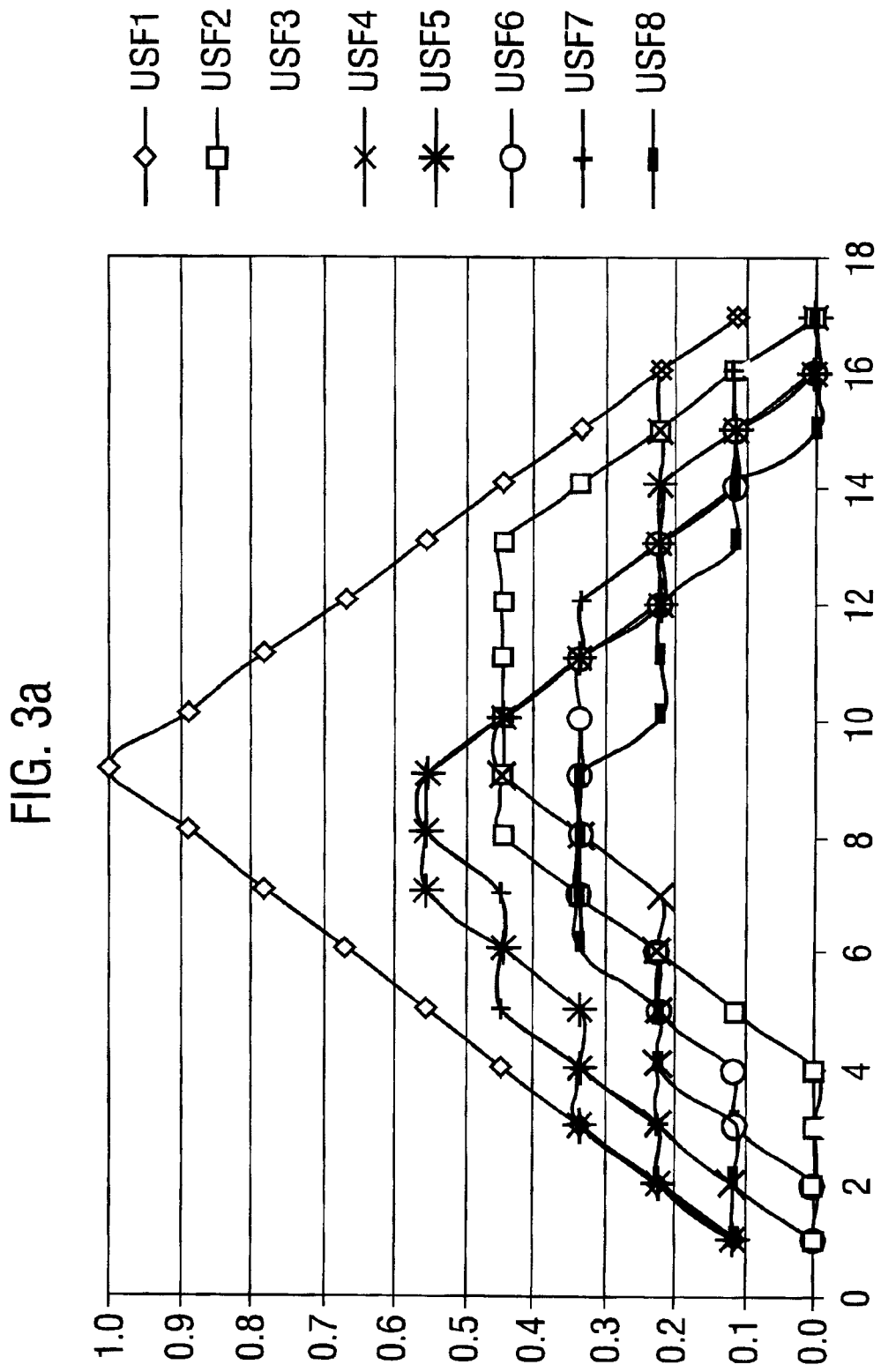
FIGS. 3a, 3b and 3c are three different autocorrelations of the first nine bits of uplink status flags.
Figure 3B:
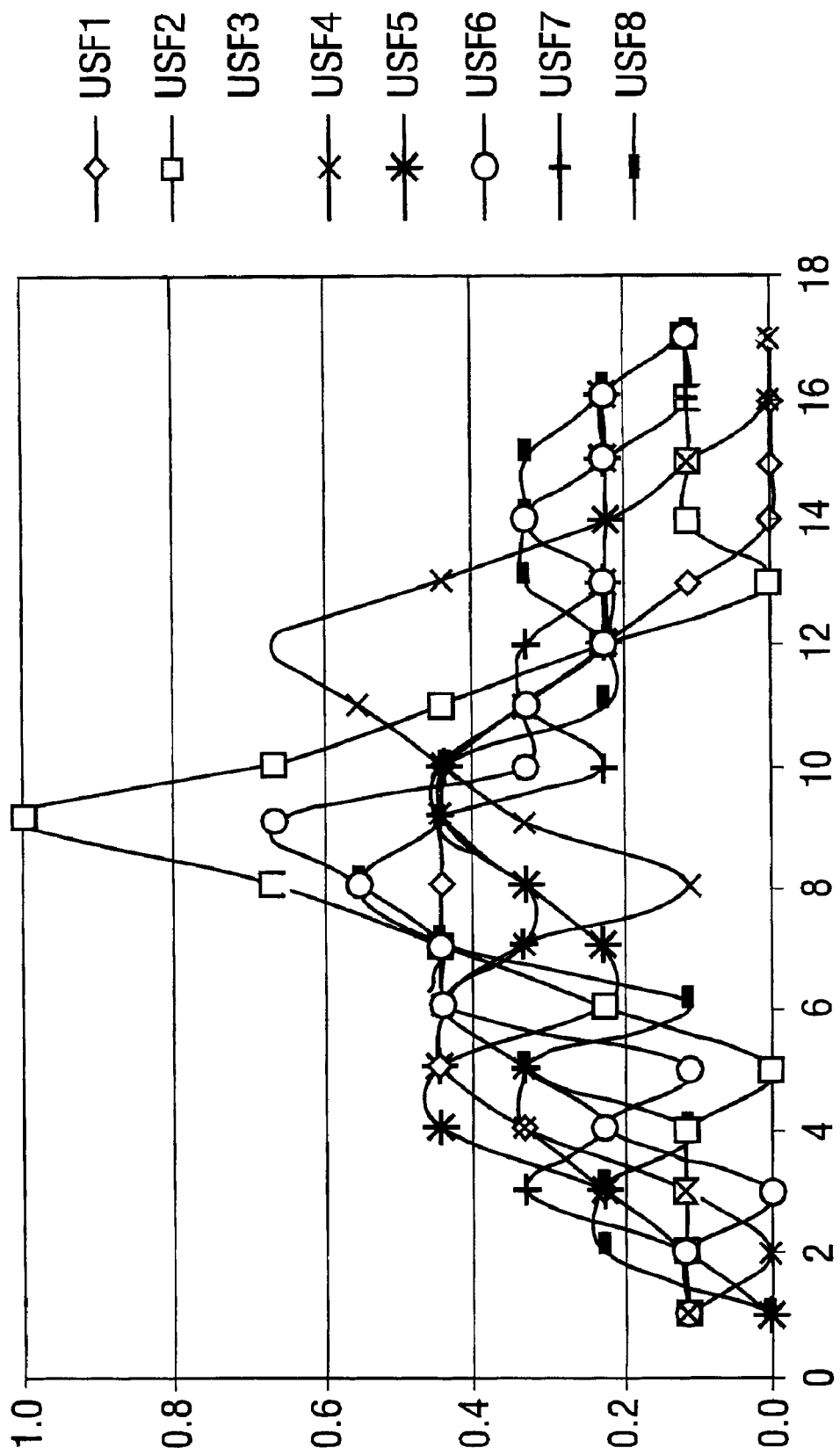
Figure 3C:
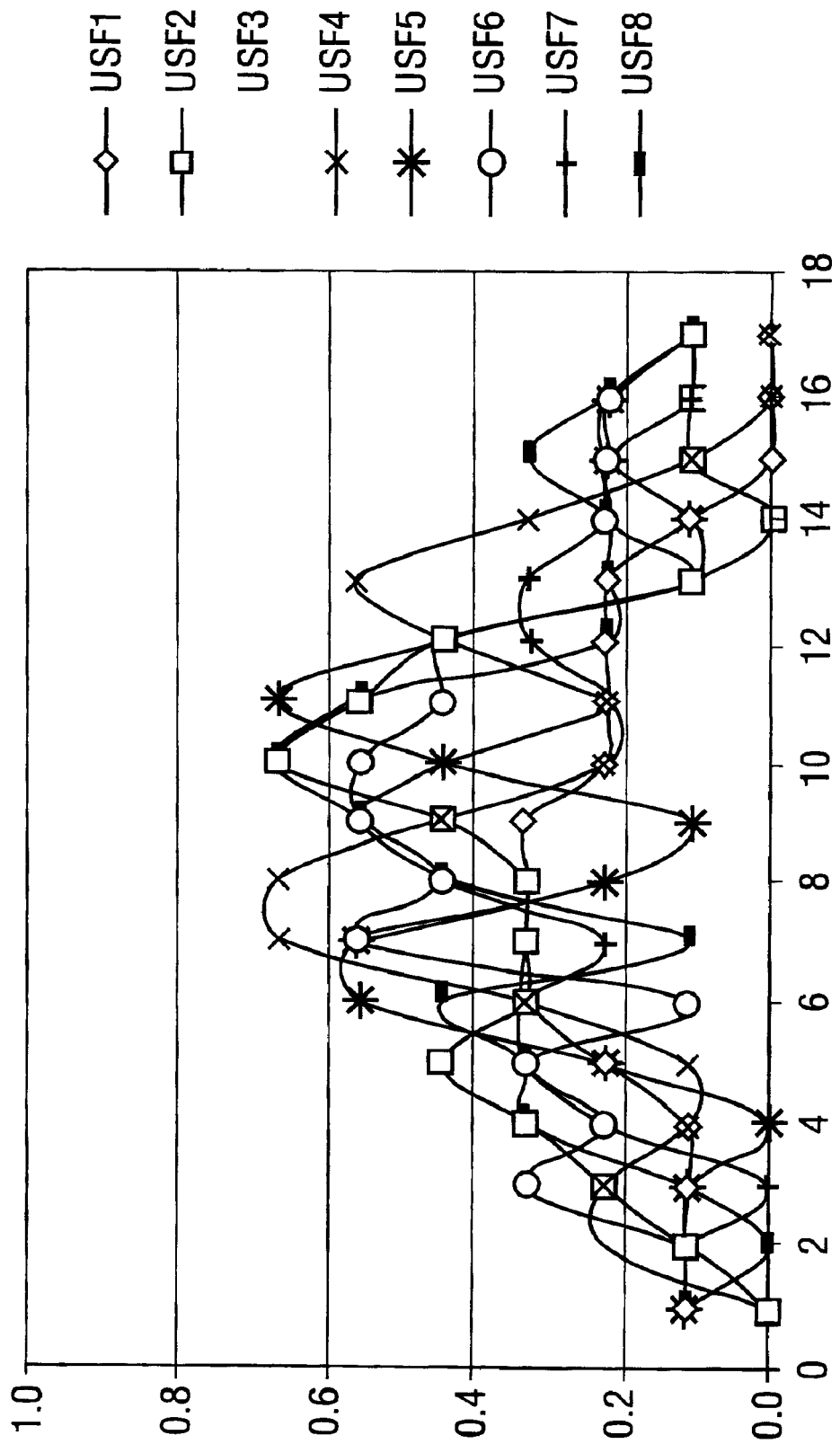

FIGS. 3*a*, 3*b* and 3*c* are examples of autocorrelation functions for the eight USFs. In FIG. 3*a* there is a marked peak for USFI, indicated on the graph by a diamond shape, while the other seven USFs show either no peak or much lower peaks. In FIG. 3*b*, the peak is associated with USF2, indicated by ' a square; and in FIG. 3*c* the peak is associated with USF3 indicated by a triangle.

If the user 12 is an RT-EGPRS user, and identifies one of USFs 1, 3, 5 or 7, the mobile then looks for the remaining 27 bits in the first burst. If the user 12 is an EGPRS user and identifies one of the USFs 2, 4, 6 or 8, the mobile then looks for the remaining 27 bits in the next 3 bursts.

Figure 4:
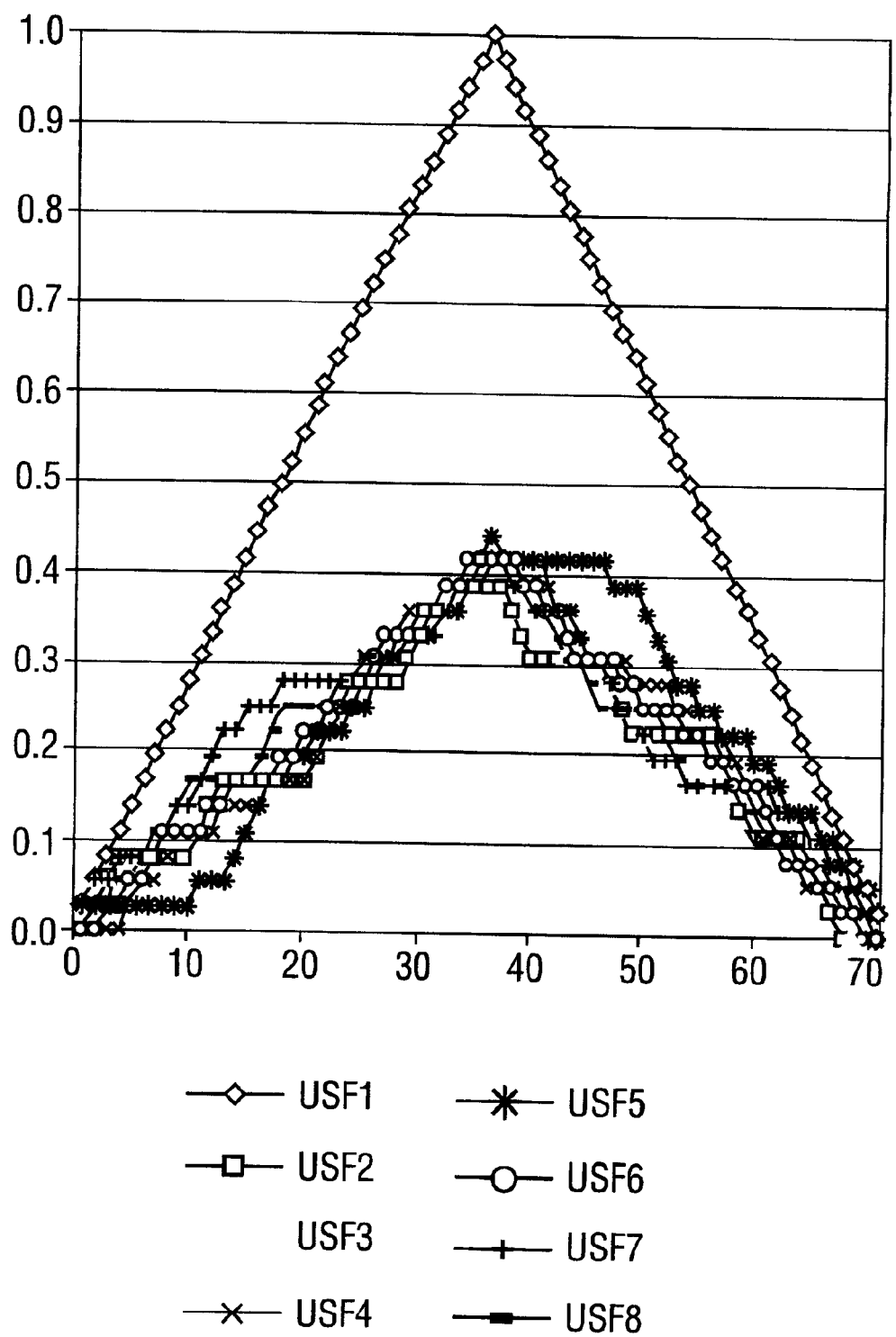
FIG. 4 shows a correlation of the whole 36 bits of uplink status flags.

As a further confirmation measure, both types of users can be arranged to perform a further correlation using the full 36 bits of the relevant USF sequence. A typical 36 bit correlation is shown in FIG. 4; the peak for USF 1, indicated by diamonds, is illustrated. This second correlation is used as confirmation of the earlier 9-bit correlation.

Once the RT-EGPRS user mobile 12 has recognized its USF with certainty, the last bit is known. Block decoding apply (36, 2) instead of (36, 3) as in the prior art, can be used. Such block coding is described in our co-pending patent application number filed on even date.

Figure 5:
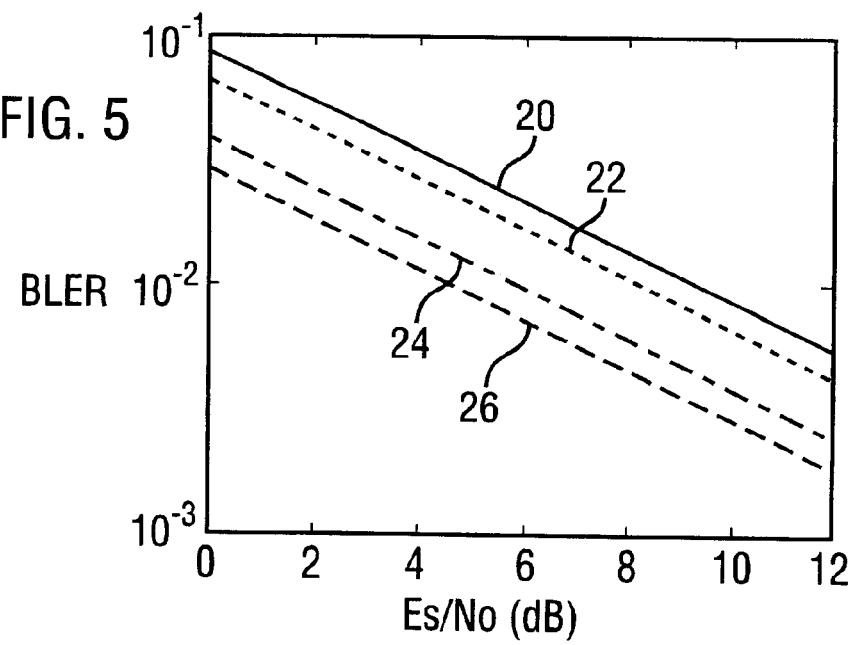
FIG. 5 illustrates performance of old and new coding methods.

FIG. 5 is a plot of BLock Error Rate(BLER) against Es/No in dBs for four block decoding methods; block decoding (36, 3) minimum distance 20 is indicated by the line 20; (36, 2) minimum distance 20 is indicated by the line 22; (48, 3) minimum distance 27 is indicated by the line 24; and (48, 2) minimum distance 27 is indicated by the line 26.

Using the same code words, a gain of about 4 dBs can be achieved by using (36,2) instead of (36, 3) block decoding. If new block code is introduced and (48, 2) block code with the same minimum distance as (48, 3) code can be used with the same minimum distance, then a gain of about 5 dBs can be achieved in comparison with the (36, 3) block code. A major part of the degradation of the BLER has been compensated.

What is claimed is:

1. In the general packet radio service telecommunications system, a method of decoding uplink status flags having reduced interleaving depth in a radio link control/medium access control block comprising the steps of:
   selecting a first plurality of uplink status flags and providing all flag bits in a first burst of a group of bursts; and
   selecting a second plurality of uplink status flags and providing a predetermined number of bits of the uplink status flags in the first burst of said group of bursts and remaining bits in other bursts of the group.

2. A method according to claim 1 in which the first plurality of uplink status flags all have a first common feature and the second plurality of uplink status flags all have a second common feature.

3. A method according to claim 2 in which the first common feature is that a third bit of an uncoded uplink status flag is a one and the second common feature is that a third bit of an uncoded uplink status flag is a zero.

4. A method according to claim 1 in which one plurality of uplink status flags is associated with a first group of mobile users and the other plurality of uplink status flags is associated with a second group of mobile users.

5. A method according to claim 4 in which the first and second groups of mobile users are respectively users in the Enhanced General Packet Radio Service and in the Real Time-Enhanced General Packet Radio Service.

6. A General Packet Radio Service comprising:
   a plurality of base transceiver stations (14), a plurality of radio network controllers (16); and
   a core network (18), wherein each base transceiver station (14) is arranged to decode uplink status flags for a first group of voice users by providing all flag bits in a first burst of a radio link control medium access control block, and for a second group of voice users by providing a predetermined number of bits in the first burst of the radio link control medium access control block and the remaining bits in subsequent bursts.

7. A mobile terminal for use in a system according to claim 6 in which the mobile terminal is associated with a first or a second group of voice users, and is arranged to perform an autocorrelation on a predetermined number of bits in a uplink status flag received from a first burst of the radio link control medium access control block, whereby said terminal determines whether that uplink status flag is associated with the same group of voice users as said terminal.

8. A mobile terminal according to claim 7 in which said predetermined number of bits is nine.

9. A mobile terminal according to claim 8 further arranged to perform a further autocorrelation on the whole number of received uplink status flag bit.

10. A mobile terminal according to claim 7 in a first group and arranged so that, on determination that a received uplink status flag is associated with the first group, the terminal receives the remaining bits of the uplink status flag from said first block.

11. A mobile terminal according to claim 10 further arranged to perform a further autocorrelation on the whole number of received uplink status flag bits.

12. A mobile terminal according to claim 7 in the second group and arranged so that, on determination that a received uplink status flag is associated with the second group, the terminal received the remaining bits of the uplink status flag from the subsequent blocks of said group.

* * * * *